(12) United States Patent
Gibson et al.

(10) Patent No.: US 10,859,205 B2
(45) Date of Patent: Dec. 8, 2020

(54) HOLDER FOR A COMMUNICATION DEVICE USED WITH A GREASE GUN

(71) Applicant: SKF Canada Limited, Scarborough (CA)

(72) Inventors: Shawn Gibson, Calgary (CA); Timothy Andrew Harris, Calgary (CA); Craig McFarland, Calgary (CA); Raj Saini, Calgary (CA); Daren P Tremaine, Silverton (CA); Lois Gayle Wride, Calgary (CA)

(73) Assignee: SKF CANADA LIMITED, Scarborough (CA)

( * ) Notice: Subject to any disclaimer, the term of this patent is extended or adjusted under 35 U.S.C. 154(b) by 0 days.

(21) Appl. No.: 16/223,261

(22) Filed: Dec. 18, 2018

(65) Prior Publication Data
US 2020/0191330 A1 Jun. 18, 2020

(51) Int. Cl.
*H04M 1/00* (2006.01)
*F16N 99/00* (2006.01)
*F16M 13/02* (2006.01)
*F16N 5/00* (2006.01)

(52) U.S. Cl.
CPC ............ *F16N 99/00* (2013.01); *F16M 13/02* (2013.01); *F16N 5/00* (2013.01); *F16N 2230/02* (2013.01); *F16N 2270/70* (2013.01)

(58) Field of Classification Search
CPC ....... H04W 88/02; F16M 13/04; F16N 99/00; F16N 5/00; F16N 2230/02; F16N 2270/70; A61B 1/00133; A61B 1/05
See application file for complete search history.

(56) References Cited

U.S. PATENT DOCUMENTS

| 2014/0213848 | A1* | 7/2014 | Moskowitz | A61B 17/29 600/106 |
| 2015/0115112 | A1* | 4/2015 | Noh | H05K 5/0234 248/126 |
| 2017/0127501 | A1* | 5/2017 | Isaacs | B25F 5/00 |

* cited by examiner

*Primary Examiner* — Nhan T Le
(74) *Attorney, Agent, or Firm* — J-TEK Law PLLC; Scott T. Wakeman; Mark A. Ussai

(57) ABSTRACT

A holder for mounting a communication device to a grease gun, which has a housing and a control disposed within the housing, includes a bracket connected with the grease gun. The bracket has a first end coupled with the grease gun housing and a second end coupleable with the communication device so as to secure the device to the grease gun. Preferably, the holder further includes a frame coupled with the bracket second member for receiving the communication device to removably couple the communication device with the grease gun. The communication device may be a smartphone, a portable media player, a portable computing device or any similar device and wirelessly communicates with a control within the grease gun housing.

10 Claims, 15 Drawing Sheets

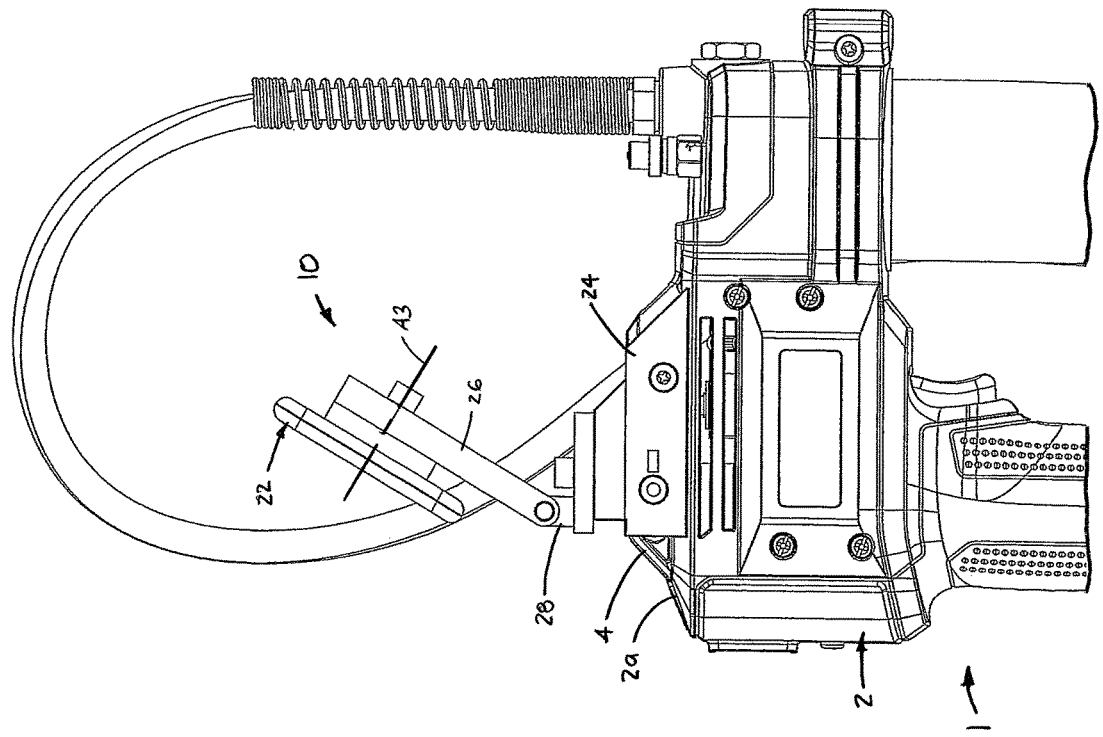
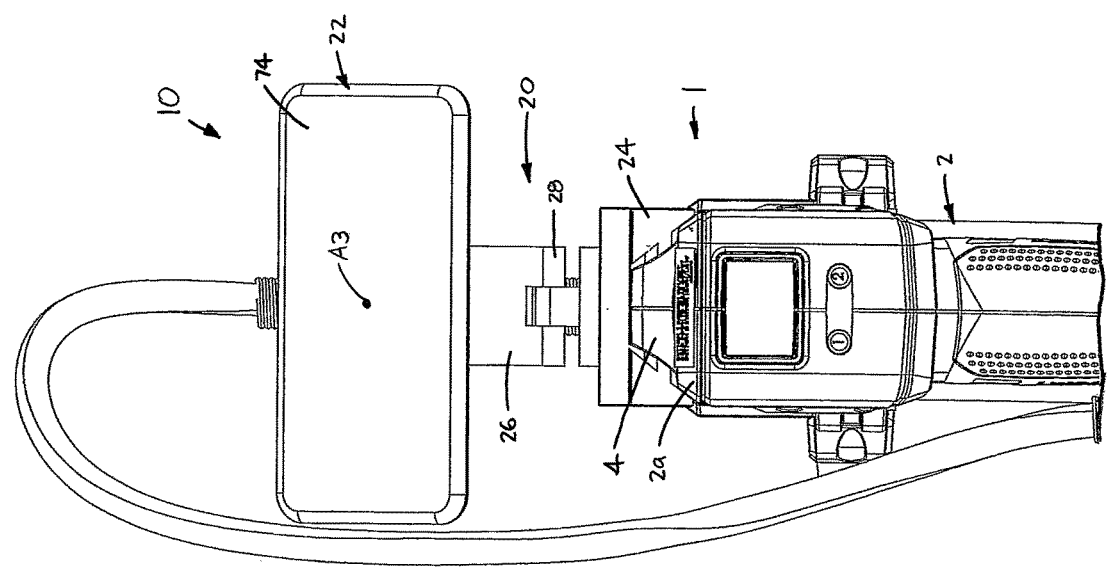

HOLDER FOR A COMMUNICATION DEVICE USED WITH A GREASE GUN

BACKGROUND OF THE INVENTION

The present invention relates to grease guns, and more particularly to devices for communicating with grease gun controls.

Grease guns are well known and typically include a housing with a discharge nozzle, a reservoir within the housing containing grease, and a mechanism for transporting grease from the reservoir for discharge from the nozzle. Certain grease guns have electronic controls for operating the grease gun, which may communicate with one or more external devices to provide a user with information on the operation of the grease gun.

SUMMARY OF THE INVENTION

In one aspect, the present invention is a holder for mounting a communication device to a grease gun, the grease gun having a housing and the communication device having a display. The holder basically comprises a bracket having a first end coupled with the grease gun housing and a second end removably coupleable with the communication device so as to secure the device to the grease gun.

In another aspect, the present invention is a communication assembly for a grease gun, the grease gun having a housing and a control disposed within the housing. The communication assembly comprises a communication device configured to wirelessly communicate with the grease gun control and having a display for displaying information received from the control. A bracket has a first end coupled with the grease gun housing and a second end coupleable with the communication device so as to secure the device to the grease gun.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 11, are each a broken side view of the grease gun with the holder, shown in a forwardmost, a central and a rearwardmost position, respectively, about a first axis;

FIG. 12, are respectively a front and a side broken view of the grease gun and the holder, showing the holder in a position angularly displaced about a second axis from an initial position shown in FIG. 2;

FIG. 13, are respectively a front and side broken view of the grease gun and the holder, showing the holder in a first, portrait orientation about a third axis;

FIG. 14A and FIG. 14B, collectively FIG. 14, are respectively a front and side broken view of the grease gun and the holder, showing the holder in a second, landscape orientation about the third axis.

DETAILED DESCRIPTION OF THE INVENTION

Figure 1:
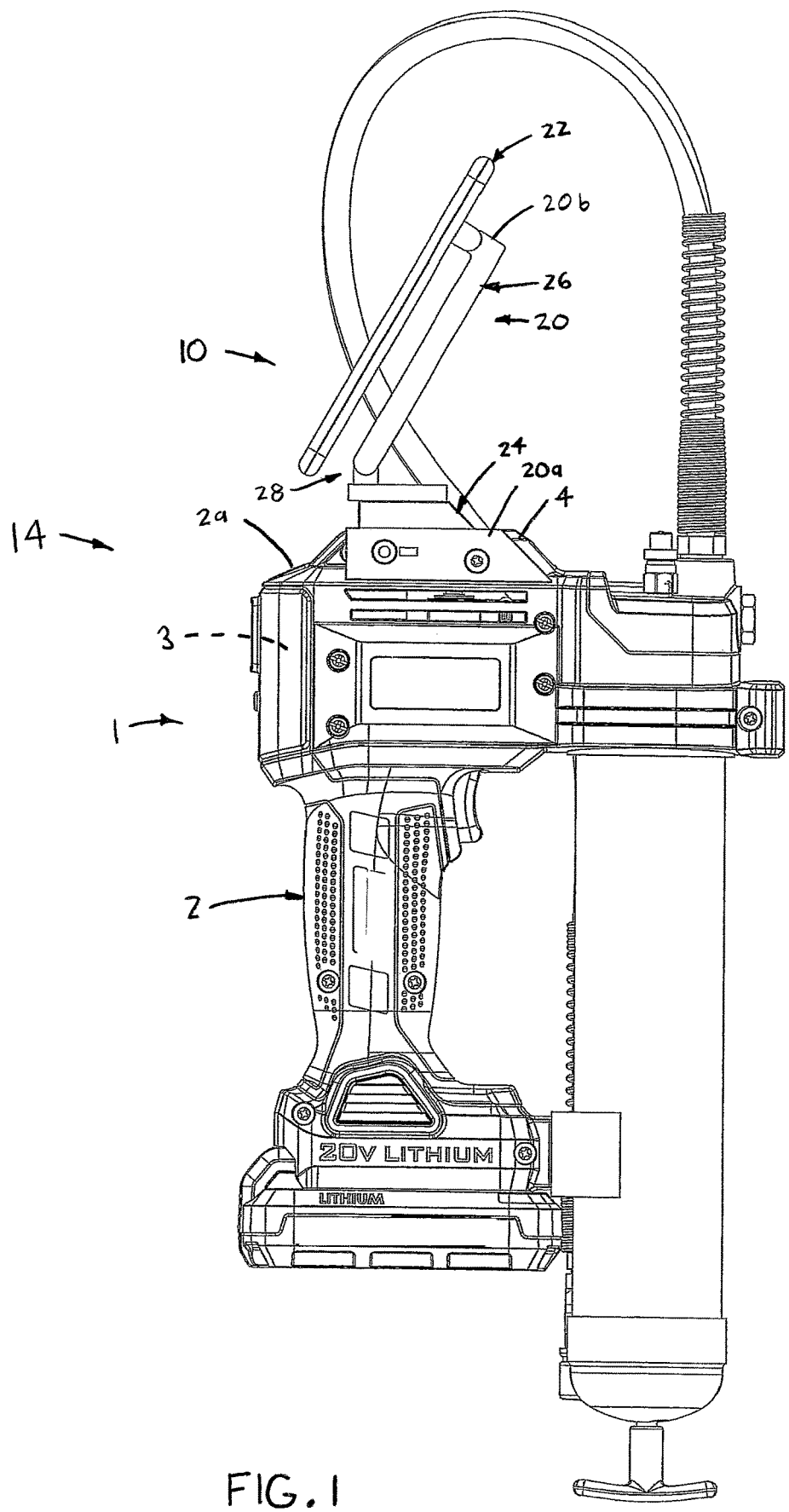
FIG. 1 is side view of a grease gun including a holder in accordance with the present invention.

Certain terminology is used in the following description for convenience only and is not limiting. The words "lower", "upper", "top", "bottom", "forward", and "rearward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 10:
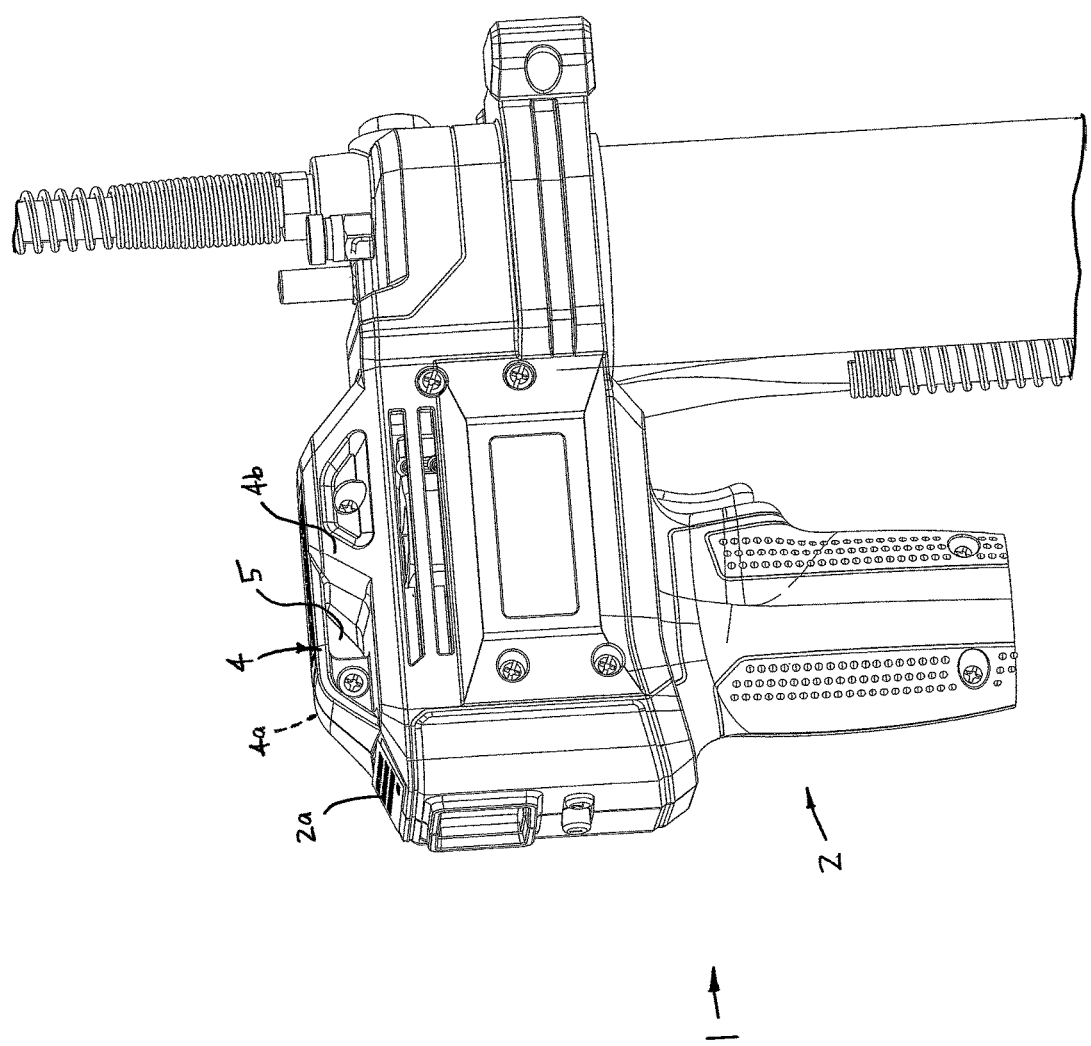
FIG. 10 is a broken-away, enlarged side view of a top portion of a grease gun, showing structure for which a preferred construction of the holder is adapted to mount.

Referring now to the drawings in detail, wherein like numbers are used to indicate like elements throughout, there is shown in FIGS. 1-14 a holder 10 for mounting a communication device 12 (FIG. 2) to a grease gun 1 so as to form a communication assembly 14. The grease gun 1 includes a housing 2 and a control 3 (FIG. 1) for operating the gun 1; most preferably, the grease gun 1 is formed at least generally as described in U.S. patent application Ser. No. 15/669,570 filed on Aug. 4, 2017, the entire contents of which are hereby incorporated by reference herein. Preferably, as shown in FIG. 10, the grease gun housing 2 has an upper end 2a with an elongated projection 4 and a "lanyard" opening 5 extending through the projection 4, for reasons discussed below. The communication device 12 has a display 16 for displaying information received from the control 3 and preferably includes a touchscreen, keypad (not depicted) or other means for inputting information, and is preferably configured to wirelessly communicate with the grease gun control 3. Most preferably, the communication device 12 is a smartphone, but may be a portable media player (e.g., an Apple® Ipod), a portable computing device, or any other similar device capable of at least receiving and displaying information from the grease gun control 3.

The holder 10 basically comprises a bracket 20 having a first end 20a coupled with the grease gun housing 2, preferably with the housing upper end 2a, and a second end 20b removably coupleable with the communication device 12 so as to secure the device 12 to the grease gun 1. Preferably, the holder 10 further comprises a frame 22 coupled with the bracket 20 and configured to receive the communication device 12 to removably couple the device 12 with the grease gun 1, as described in further detail below. However, the bracket 20 may be configured to be directly attachable to the communication device 12 or be provided with other means (adhesive pad, threaded fastener, etc.) to removably, semi-permanently or permanently attach the device 12 to the bracket 20.

Referring to FIGS. 1-4, the bracket 20 preferably includes a first member 24 attached to the grease gun housing 2 and providing the bracket first end 20a and a second member 26 attachable to the communication device 12 and providing the bracket second end 20b. The bracket second member 26 is moveable with respect to the bracket first member 24 so as to adjust a position of the communication device display 16 with respect to the grease gun housing 2. Preferably, the bracket 20 includes a joint 28 configured to pivotably couple the first and second bracket members 24, 26 such that the bracket second member 26 is angularly displaceable with respect to the bracket first member 24 about a first axis A1 extending generally parallel with the housing upper end 4, as depicted in FIG. 11. Most preferably, the joint 28 is further configured to pivotably couple the two bracket members 24, 26 such that the bracket second member 26 is also angularly displaceable with respect to the bracket first member 24 about a second axis A2 extending generally perpendicular to the first axis A1, and thus generally perpendicular to the housing upper end 4, as shown in FIG. 12. Alternatively, the first bracket member 24 may be pivotably coupled with the grease gun housing 2 such that the entire bracket 20 is angularly displaceable about the second axis A2.

Further, the frame 22 is preferably pivotably coupled with the bracket second member 26 so as to be angularly displaceable about a third axis A3 generally perpendicular to the first axis A1 so as to adjust an orientation of the communication device display 16 with respect to the bracket 20, and thus with respect to the grease gun housing 2, between a "portrait" orientation (FIG. 13) and a "landscape" orientation (FIG. 14). Thus, the display 16 of the communication device 12 may be adjusted to a desired position and/or orientation by any one or any combination of the above described angular displacements or "adjustment movements", i.e., pivoting the second member 26 with respect to the first member 24 about axis A1, pivoting the second member 26 with respect to the first member 24 about the second axis A2 (or the entire bracket 20 with respect to the housing 2) and/or pivoting the frame 22 with respect to the bracket second member 26 about the third axis A3. However, the holder 10 of the present invention may be constructed with only two or even one of the above adjustment movements if desired, as discussed below. Furthermore, the bracket 20 is preferably formed such that at least a portion of the bracket 20 is configured to deflect or fracture upon an impact force on the communication device 12 of a predetermined magnitude, such impact force being insufficient to damage the communication device 12. In other words, the bracket portion will bend or fracture during an impact event at the predetermined magnitude to prevent the impact force from reaching a level that will damage the device 12 (e.g., crack the display 16).

Having described the basic construction and functions above, the preferred structure and details of the holder 10 are described in further detail below.

Referring now to FIGS. 2-9, the preferred bracket first member 24 includes a generally rectangular, generally planar base portion 30 connected with the bracket second member 26 and first and second elongated clamp portions 32, 34, respectively, connectable with the grease gun housing 2. The base portion 30 has upper and lower surfaces 31A, 31B, respectively, front and rear edges 30a, 30b, respectively, opposing side edges 30c, 30d, respectively and a through-hole 37 extending between the upper and lower surfaces 31A, 31B and including a hexagonal counterbore-section 37a extending from the lower surface 31B, for reasons discussed below. Preferably, the first clamp portion 32 is integrally formed with the base portion 30 and extends outwardly from the base lower surface 31B and along one base side edge 30c. The second clamp portion 34 is separate from the base portion 30 and, in an installed position, is disposeable against the base lower surface 31B and along the other base side edge 30d, as described below.

Referring to FIGS. 4-9, each clamp portion 32, 34 has an inner surface 33A, 35A, respectively, an opposing outer surface 33B, 35B, respectively, and a lug 36, 38, respectively. Each lug 36, 38 extends from the clamp inner surface 33A, 34A and toward the other clamp portion 34, 32, such that a free end 36a, 38a of each lug 36, 38 abuts the free end 38a, 36a of the other lug 38, 36. Further, a through-hole 40, 42 extends from each clamp outer 33B, 35B surface and through the clamp lug 36, 38, the first clamp portion 34 including an hexagonal counterbore section 40a and the second clamp portion 34 having a circular counter bore section 42a.

With this structure, the bracket first member 24 is removably coupled with the grease gun housing 2 by disposing the bracket base portion 30 on the housing projection 4 (FIG. 10) so that the first clamp portion 32 is disposed against one side 4a of the projection 4 with the lug 36 projecting into the lanyard opening 5. The second clamp portion 34 is disposed against the opposing side 4b of the housing projection 4 such that the lug 38 projects into the housing opening 5 and abuts the other lug 36, then a threaded fastener 44 (e.g., a cap screw) is inserted through the second through-hole 42 and into the first through-hole 40, and engages a nut (not shown) within the hexagonal counterbore section 40a. The fastener 44 is advanced through the nut until the two bracket clamp portions 32, 34 press against the associated housing projection sides 4a, 4b with sufficient pressure to releasably secure the bracket first member 24 to the grease gun housing 2.

Referring now to FIGS. 3-9, the preferred bracket second member 26 is formed as an elongated, generally flat and rectangular bar 50 having opposing front and rear surfaces 51A, 51B, respectively, inner and outer edges 50a, 50b, respectively, and opposing elongated side edges 50c, 50d. The bar 50 has a through-hole 52 generally adjacent to the outer edge 50b for engaging with the communication device 12, specifically with the frame 22 as discussed below, and preferably has two lugs 54, 56 extending outwardly from the inner edge 50a and providing a portion of a preferred joint 28, as also described below. Preferably, the bracket second member 26 is either formed of a resilient material, such as for example polyurethane, or is provided with some means of bending, deflecting or fracturing upon an impact to the communication device 12 (e.g., "bumping" the device 12 against a machine) in order to avoid damage to the device 12, as discussed above.

Figure 13B:
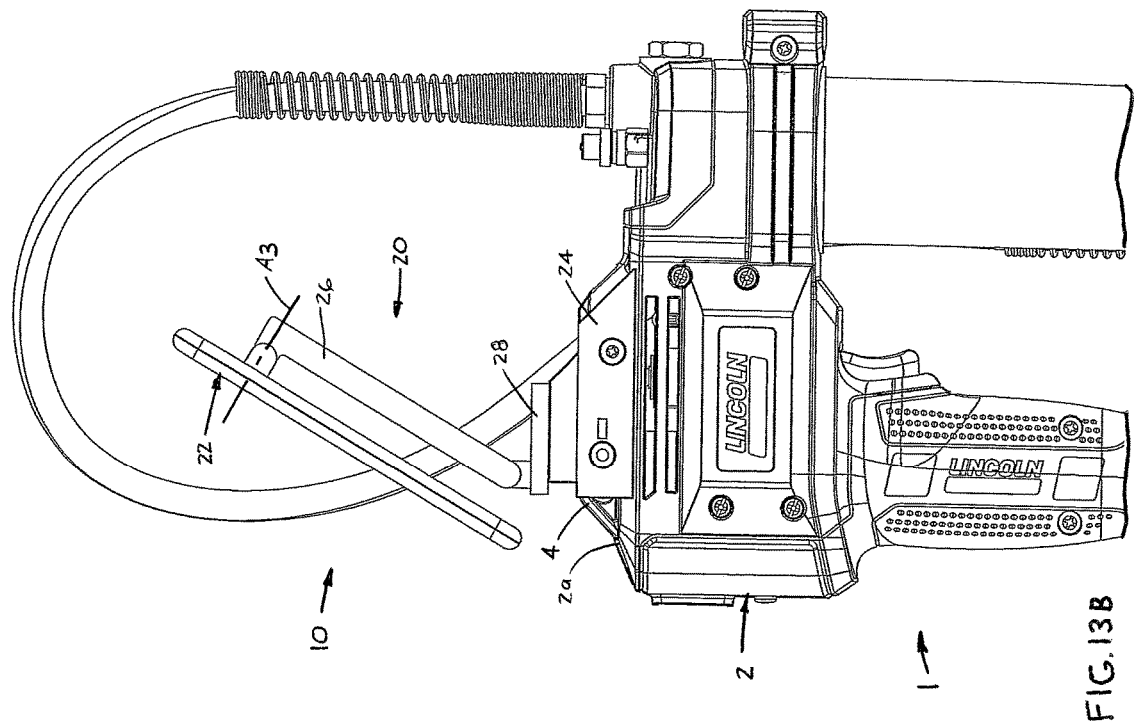
FIG. 13A and FIG. 13B, collectively
Figure 13A:
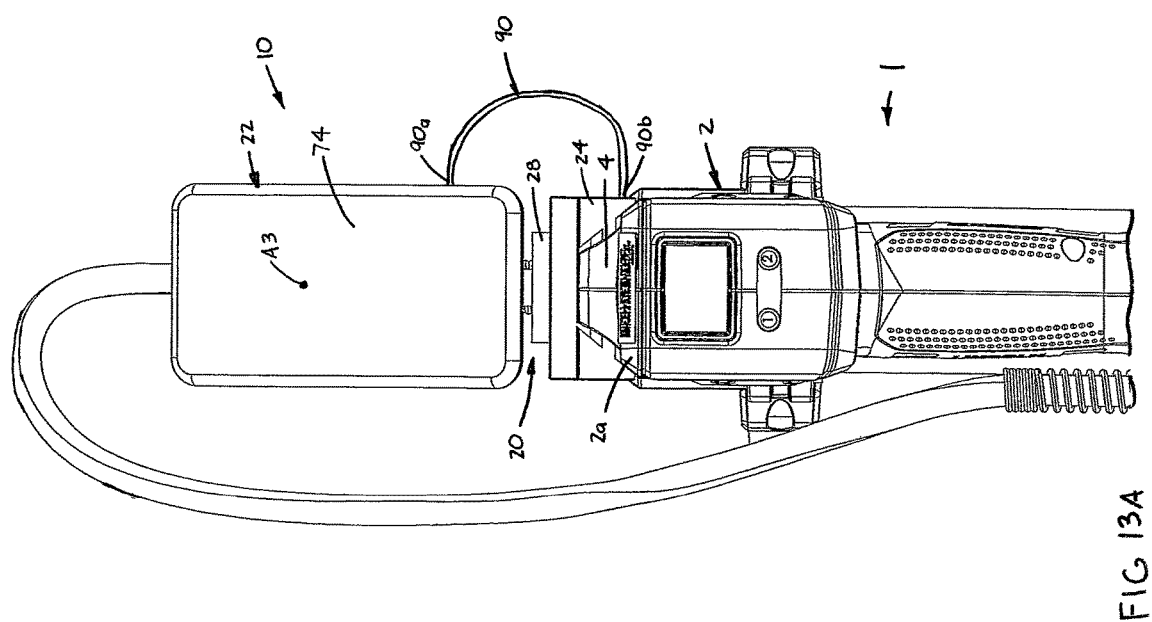
Figure 15:
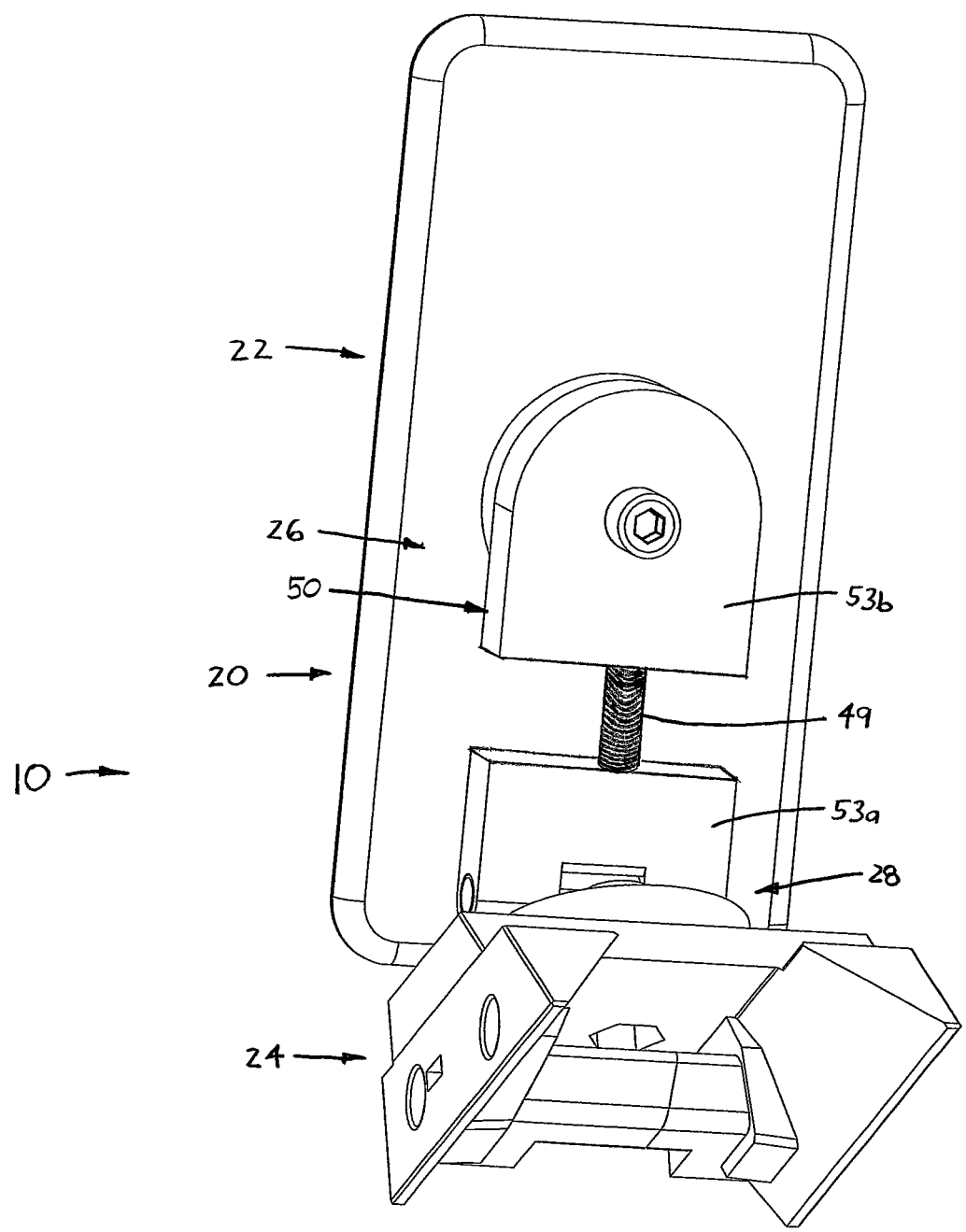
FIG. 15 is a perspective view of the holder from the bottom rear, showing an alternative structure of a bracket second member.

For example, the second member bar 50 may be formed of three separate components, an inner rigid section 53a providing the lugs 54, 56, an outer rigid section member 53a with the through-hole 52, and a coil spring 49 (or similar device) extending between and connecting the bar inner and outer sections 53a, 53b, as depicted in FIG. 15. As such, an impact on the device 12 will cause the bar outer section 53b to displace relative to the inner section 53a by bending of the coil spring 49. As a further example, the lugs 54, 56, the remainder of the bar 50, a portion of the joint 28 or/and the bracket first member 24 may be formed of a fracturable or frangible material that fractures when an impact force of a sufficient magnitude is applied to the communication device 12. Referring specifically to FIG. 13A, when a component of the holder 10 is fracturable or frangible, the holder 10 preferably further comprises a flexible retainer member 90, for example a cable or lanyard, having a first end 90a connected with the frame 22 and a second end 90b connected with the grease gun housing 2 (as depicted) or a portion of the bracket 20 adapted to remain coupled with the housing 2 in order to retain the communication device 12 coupled with the grease gun 1 after an impact event as discussed above.

Still referring now to FIGS. 3-9, in addition to the two bar lugs 54, 56 described above, the joint 28 preferably further includes a generally circular "turntable" plate 58 disposeable upon the upper surface 31A of the first bracket member base portion 30. The joint plate 58 has opposing upper and lower surfaces 59A, 59B, a central through-hole 62 and a lug 60 projecting outwardly from the upper surface 59A. The plate through-hole 62 is alignable with the base portion through-hole 37, such that a shaft 68, preferably a cap screw, extends through each hole 37, 62 and engages a nut 61 in the base counter-bore hole section 37a to rotatably couple the joint plate 58 with the base portion 30, and thus with the first bracket member 24.

Further, each one of the three joint lugs 54, 56 and 60 has a through-hole 55, 57 and 65, respectively, and the plate lug 60 is disposeable between the two bar lugs 54, 56. A pivot bar or pin 66 is disposed through all three of the lug openings 55, 57 and 65 so as to pivotally couple the bracket bar 50 with the joint plate 58, and thereby the second bracket member 26 with the first bracket member 24. Depending on the frictional engagement between the pin 66 and the lug openings 55, 57 and 65, the bracket bar 50 is pivotable about the first axis A1, which extends centrally through the pin 66, by angularly displacing the pin 66 within the central plate lug 60 or within the two bar lugs 55, 57.

Figure 2:
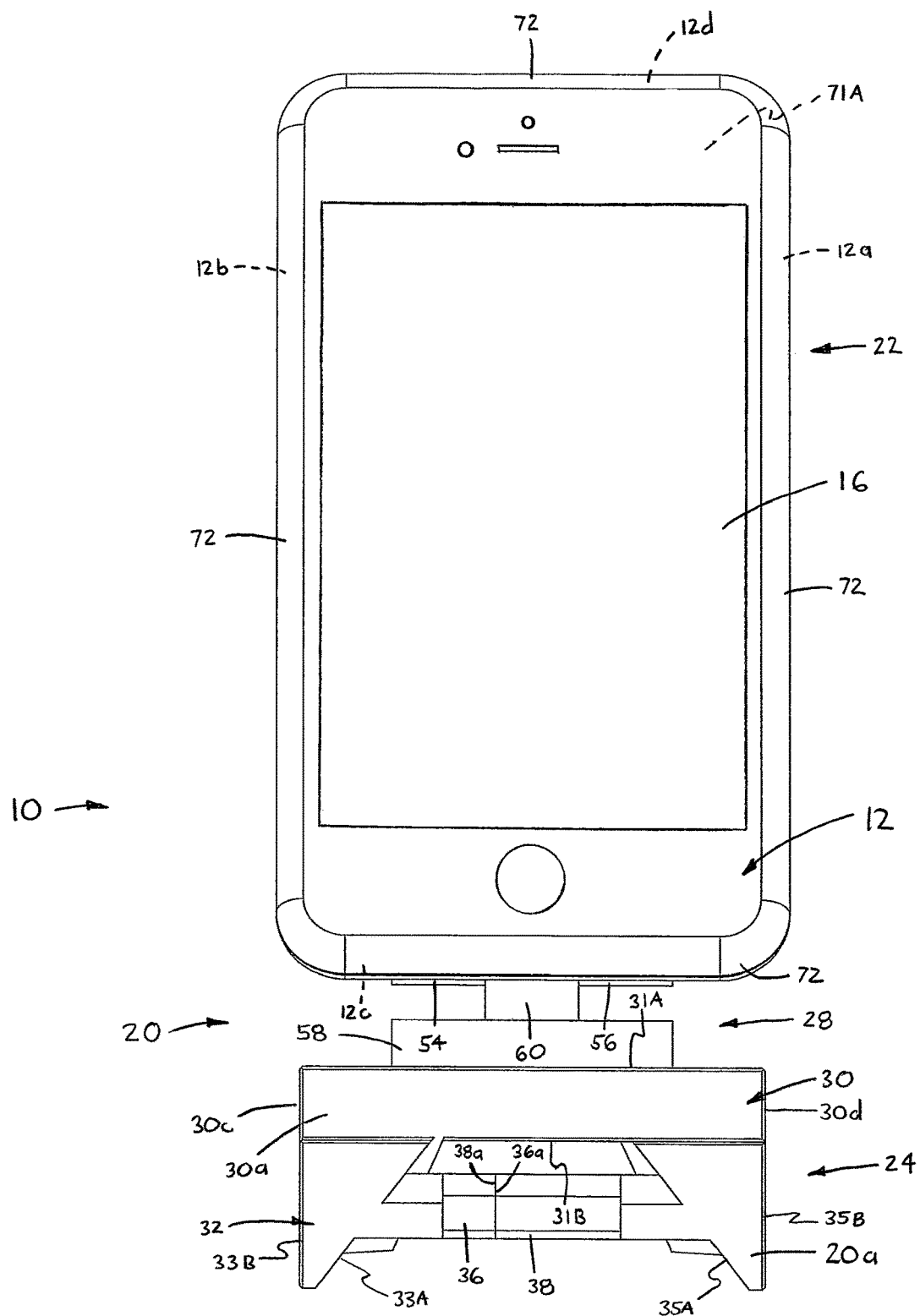
FIG. 2 is a front view of the holder, shown enlarged from FIG. 1 and with a preferred communication device.
Figure 3:
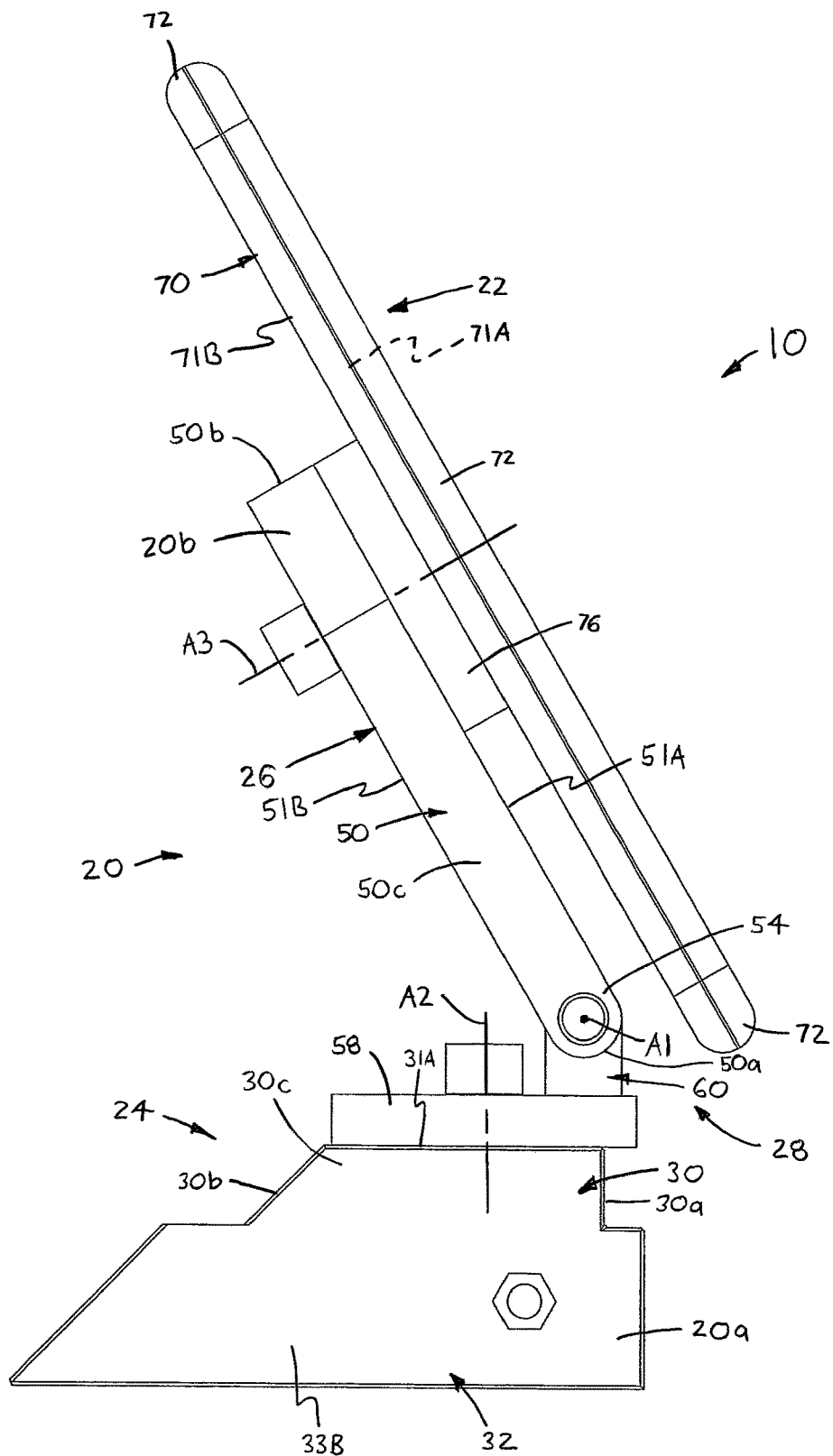
FIG. 3 is a side view of the holder.
Figure 4:
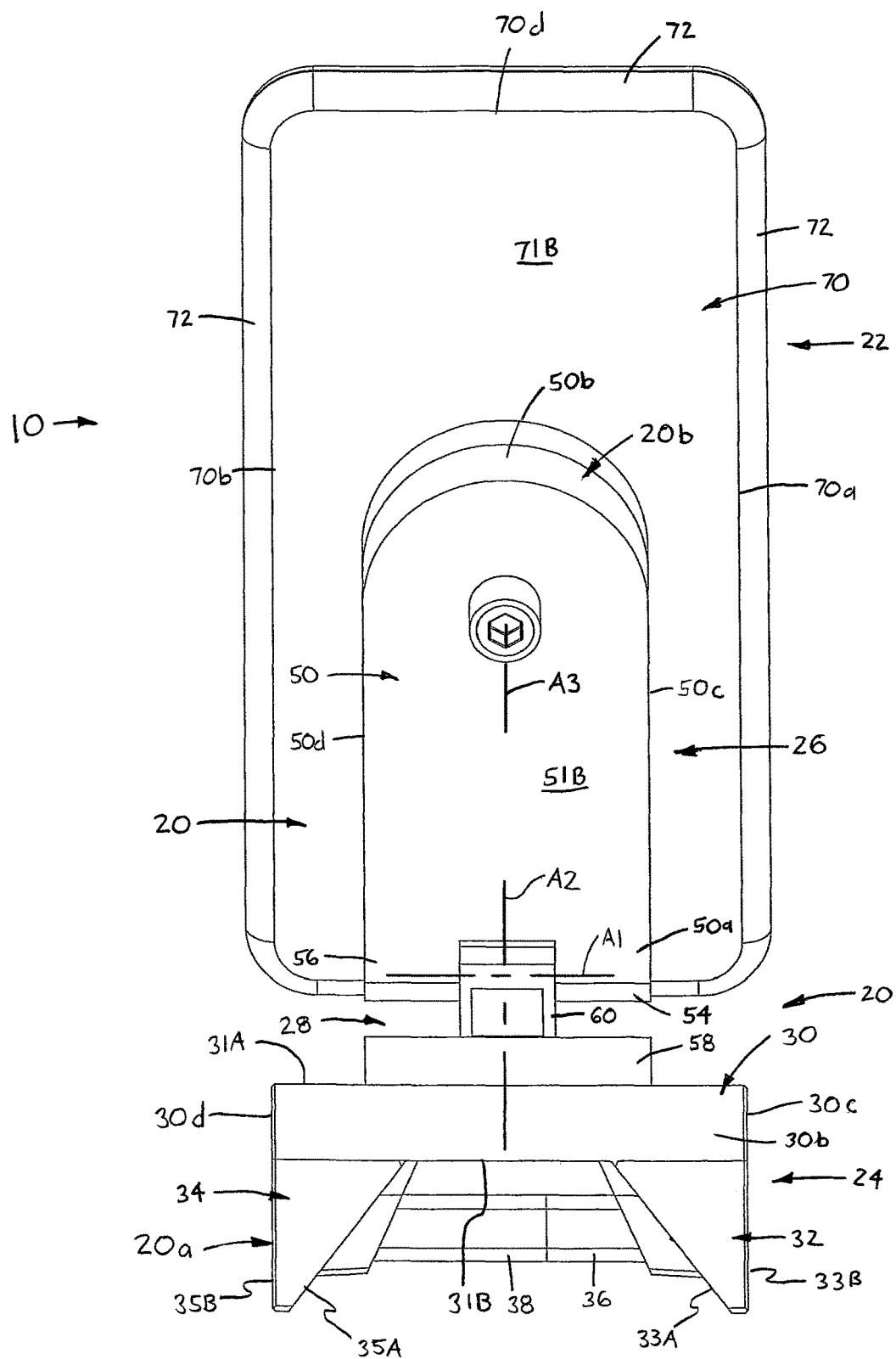
FIG. 4 is a rear view of the holder.
Figure 5:
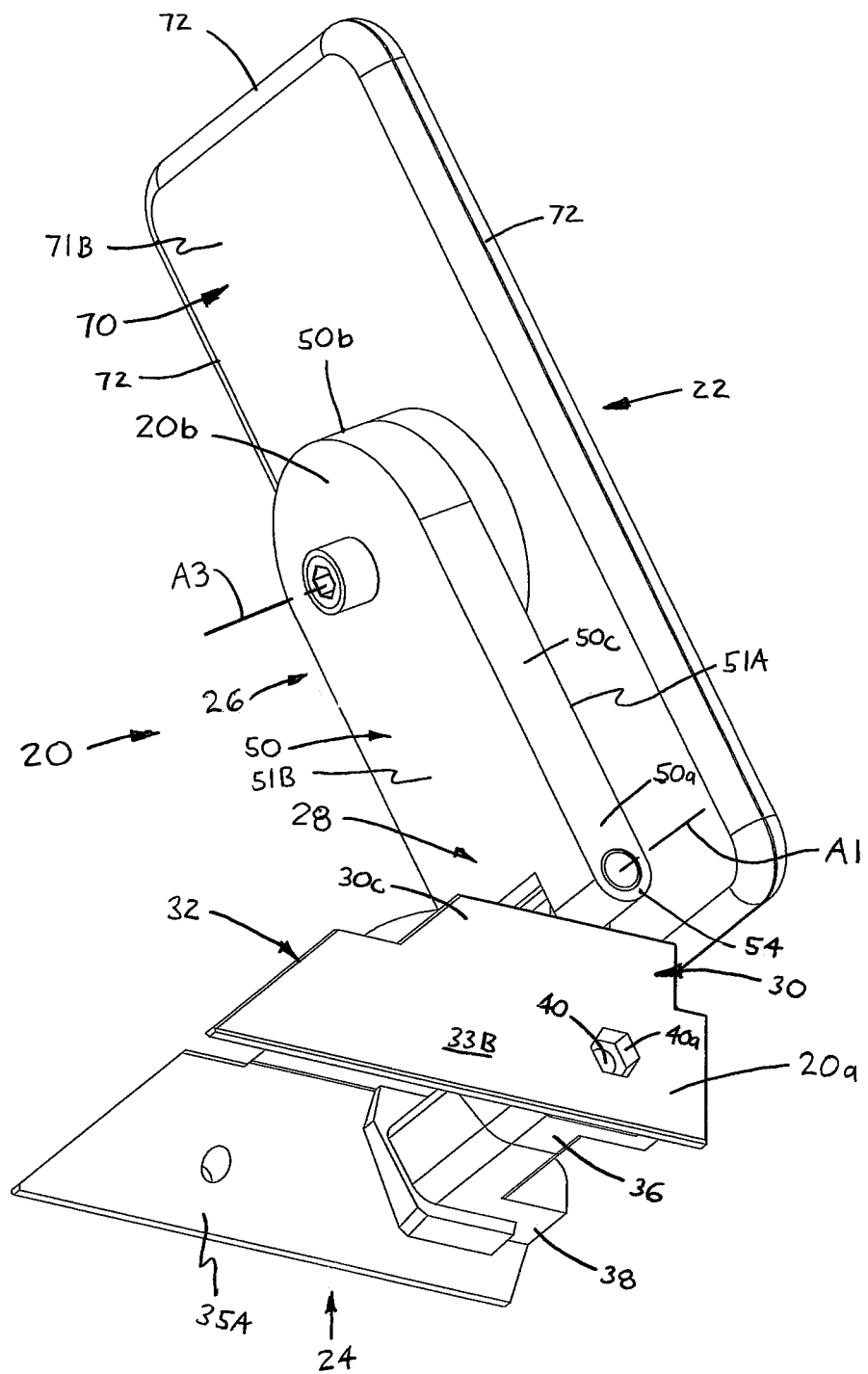
FIG. 5 is a rear perspective view of the holder from one bottom side.
Figure 6:
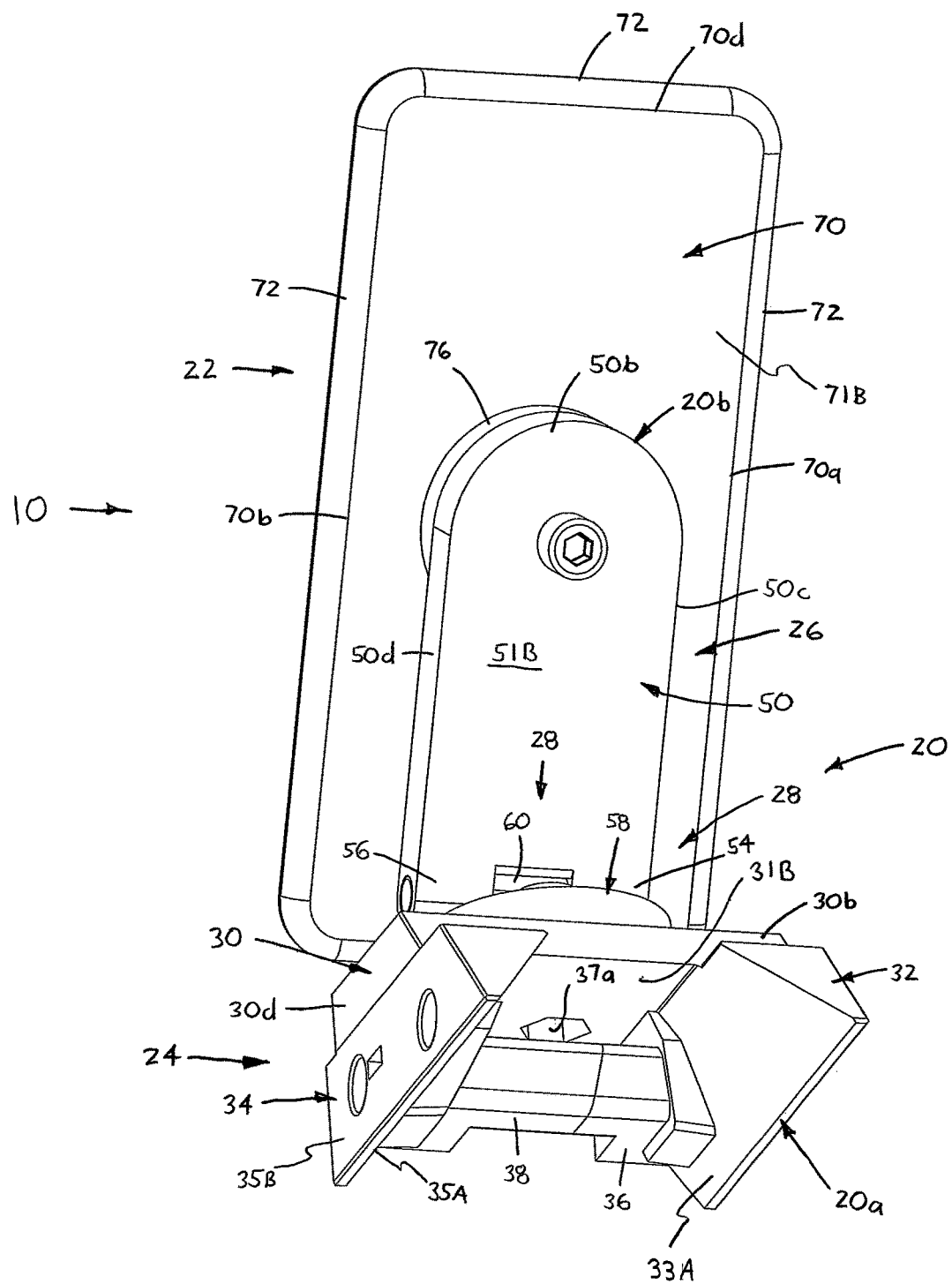
FIG. 6 is another rear perspective view of the holder from the bottom.
Figure 7:
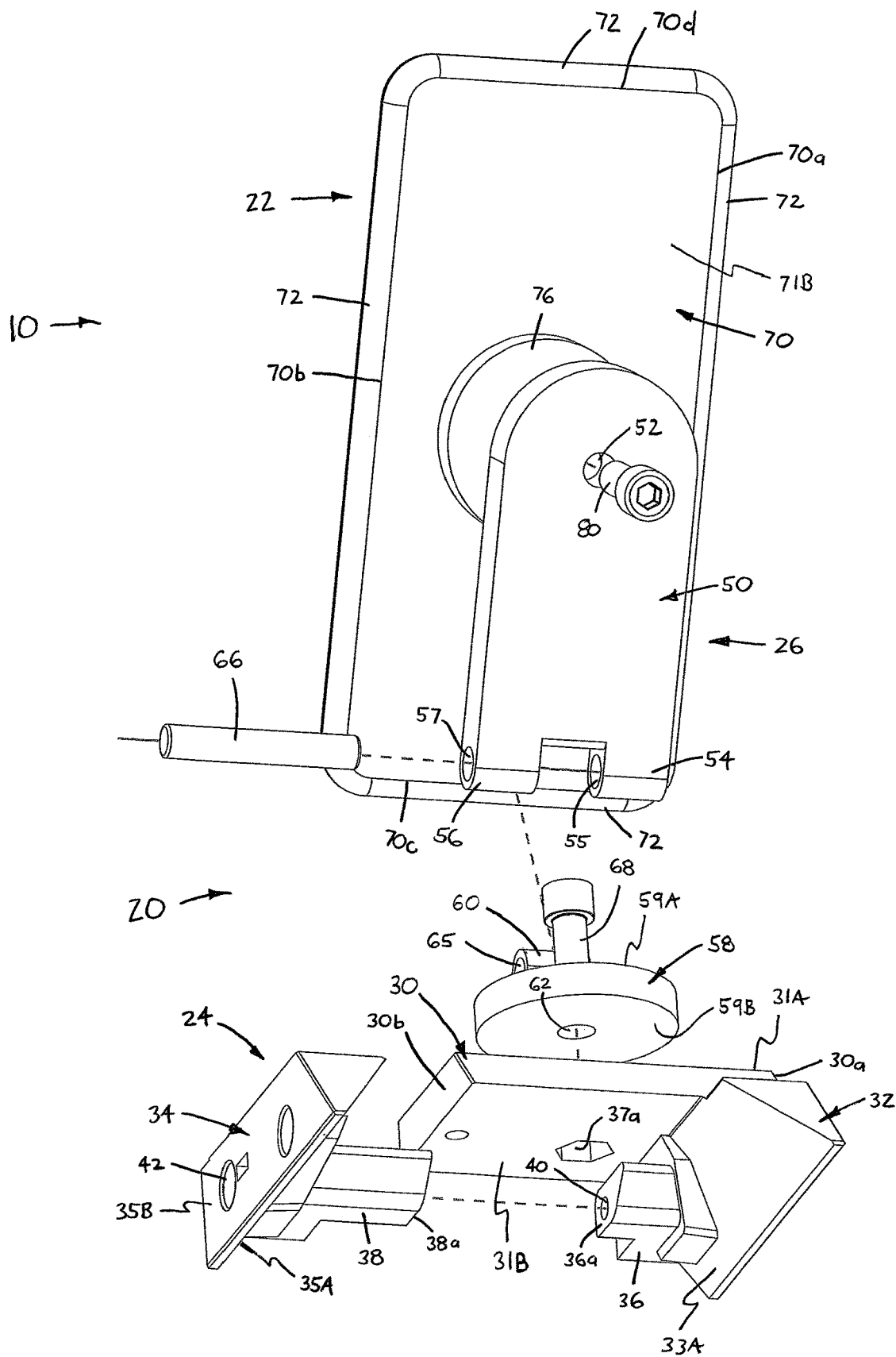
FIG. 7 is an exploded view of the holder from the bottom rear.
Figure 8:
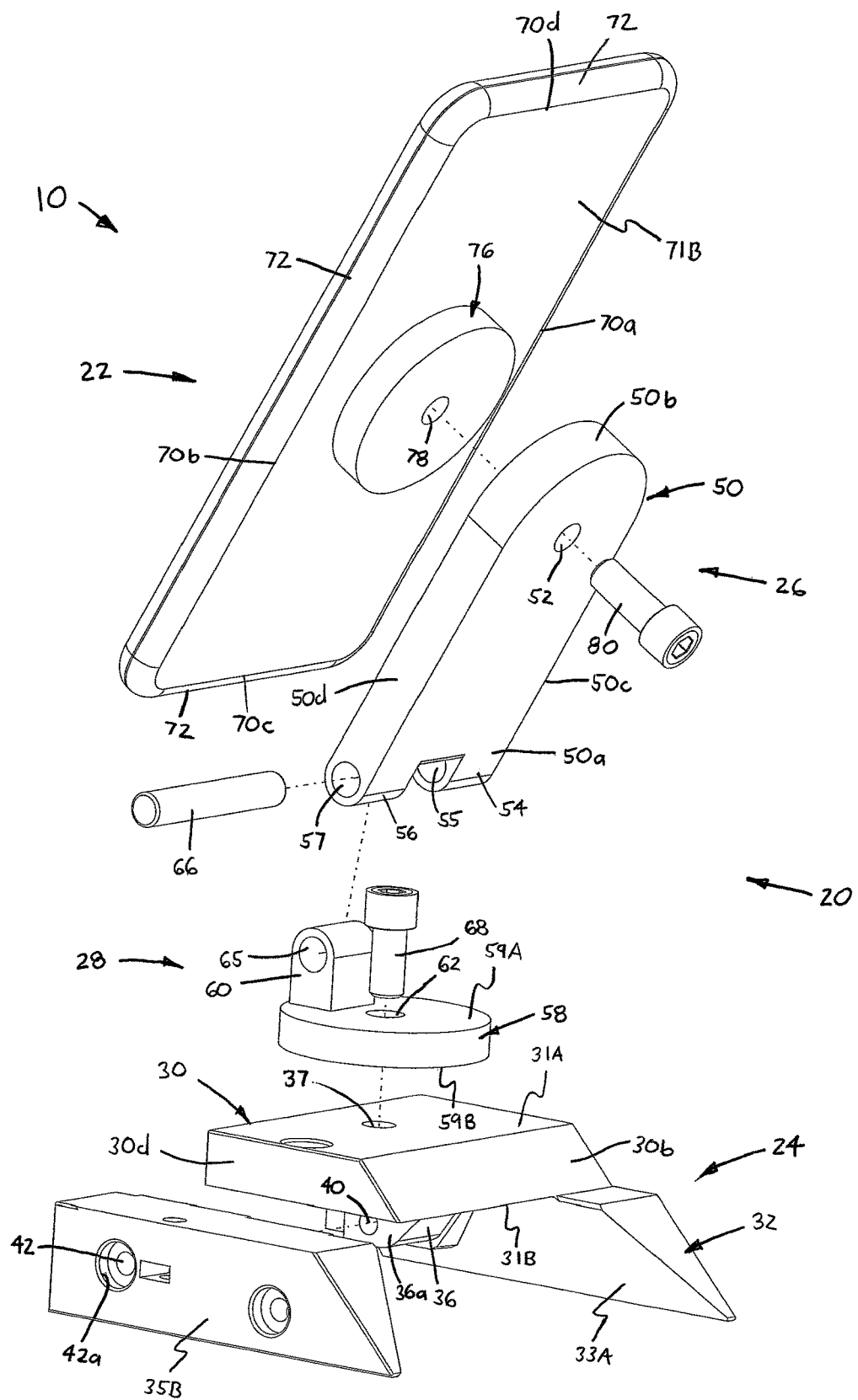
FIG. 8 is an exploded view of the holder from one rear side.
Figure 9:
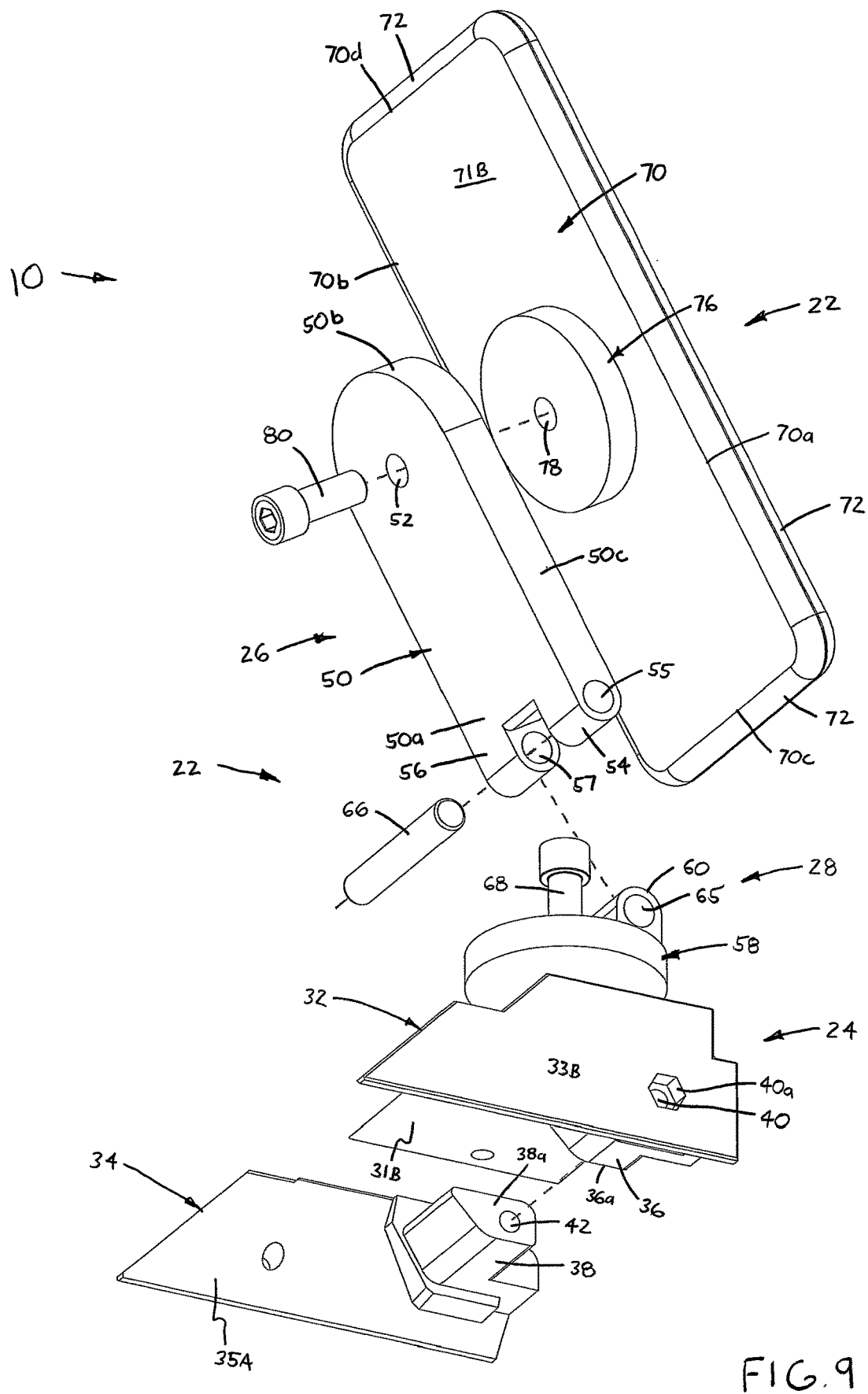
FIG. 9 is an exploded view of the holder from the other rear side.

Referring again to FIGS. 2-9, the preferred frame 22 includes a generally rectangular base member or plate 70 and at least two sidewalls 72 extending from the base plate 70. The base plate 70 has generally planar top and bottom surfaces 71A, 71B, opposing first and second edges 70a, 70b and opposing third and fourth edges 70c, 70d each extending between the first and second edges 70a, 70d. At least one pair of sidewalls 72 each extending outwardly from the top planar surface 71A and along a separate one of the first and second edges 70a, 70b or along a separate one of the third and fourth edges 70c, 70d. The frame 22 is sized such that the at least two sidewalls 72 are disposeable against a separate one of two edges 12a, 12b or 12c, 12d of the communication device 12 when the device 12 is disposed upon the base planar surface 71A, as shown in FIG. 2. Preferably, the frame 22 has four sidewalls 72 integrally formed with each other and with the frame base plate 70, such that the base plate 70 and the two or more sidewalls 72 define a cavity 74 (FIGS. 12 and 13) for receiving the communication device 12. Most preferably, the frame 22 is a commercially available case sized for a particular model of the specific communication device 12, but may alternatively be a specially manufactured component.

Further, the frame 22 preferably includes a circular coupler plate 76 disposed on the frame bottom surface 71B and having a central threaded opening 78. A threaded pivot shaft 80, for example a cap screw, extends through the through-hole 52 of the second bracket member bar 50 and threadedly engages the coupler plate opening 78 to pivotally couple the frame 22 with the bracket 20, as discussed above. Preferably, the coupler plate 76 has means for attaching to a commercially available frame/case 22, such as for example, a layer of adhesive (not shown).

Prior to use of the grease gun 1, the communication device 12 is installed within the frame 22, preferably by inserting the device 12 into the frame cavity 74 until the frame sidewalls 72 frictionally engage the sides of the communication device 12. In use, an operator of the grease gun 1 moves the communication device 12 to a desired position and orientation by proper adjustment of the holder 10 so as to be viewable during a particular grease gun operation, which is dependent upon the positioning of the gun 1 with respect to a machine, component, etc. being lubricated.

Figure 11C:
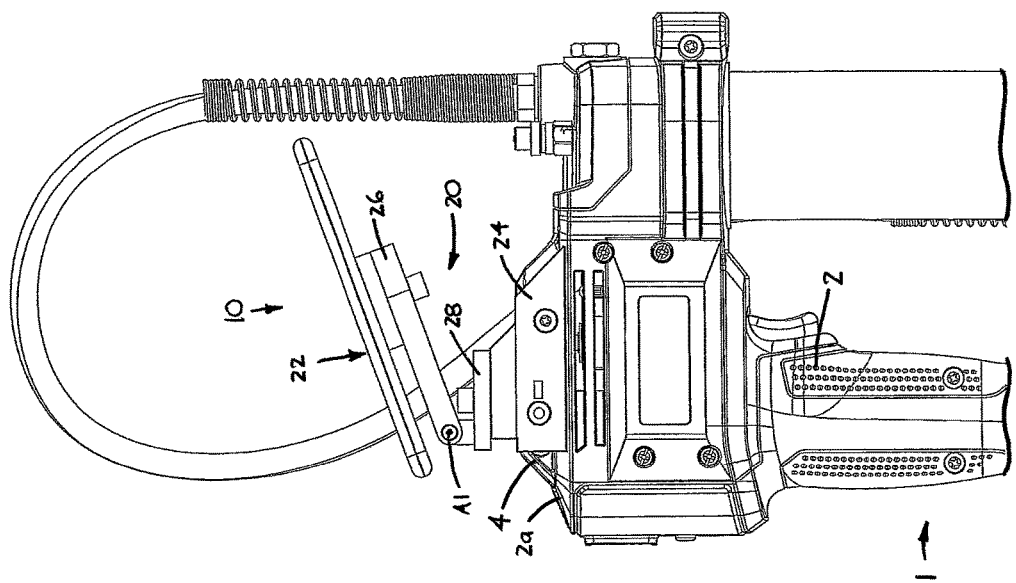
FIGS. 11A-11C, collectively
Figure 11B:
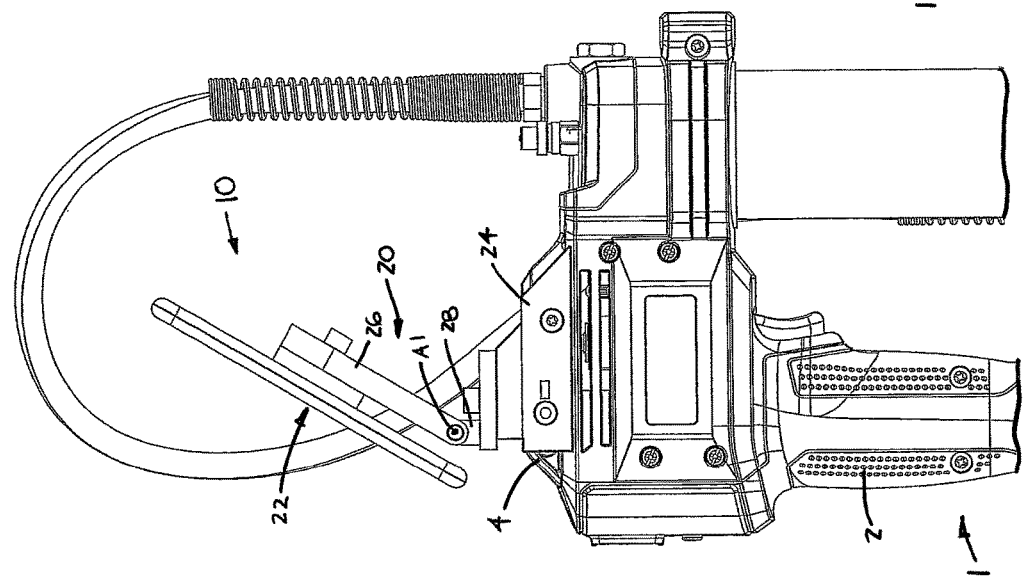
Figure 11A:
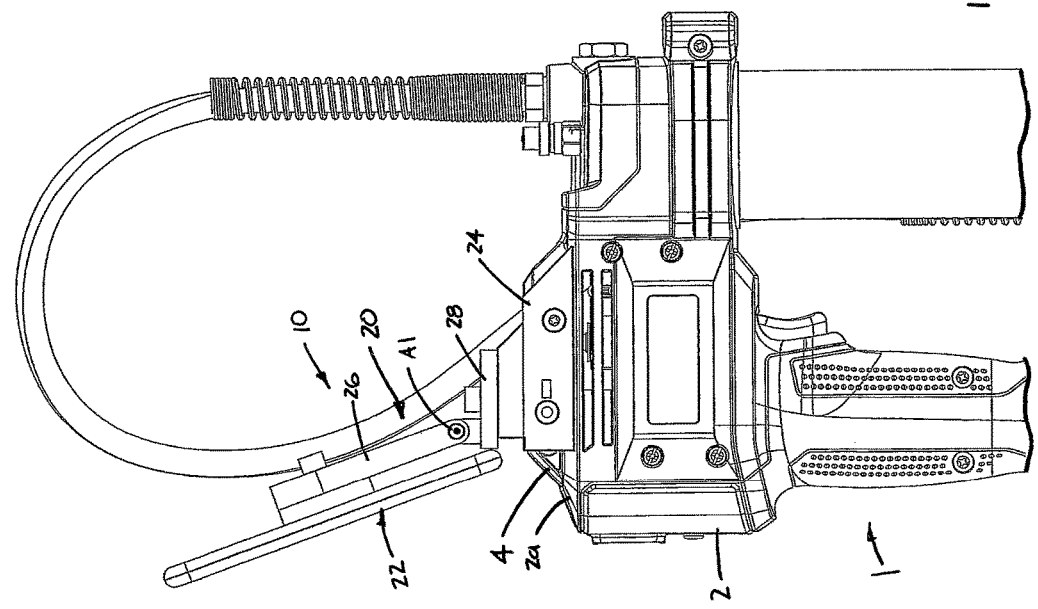
Figure 12B:
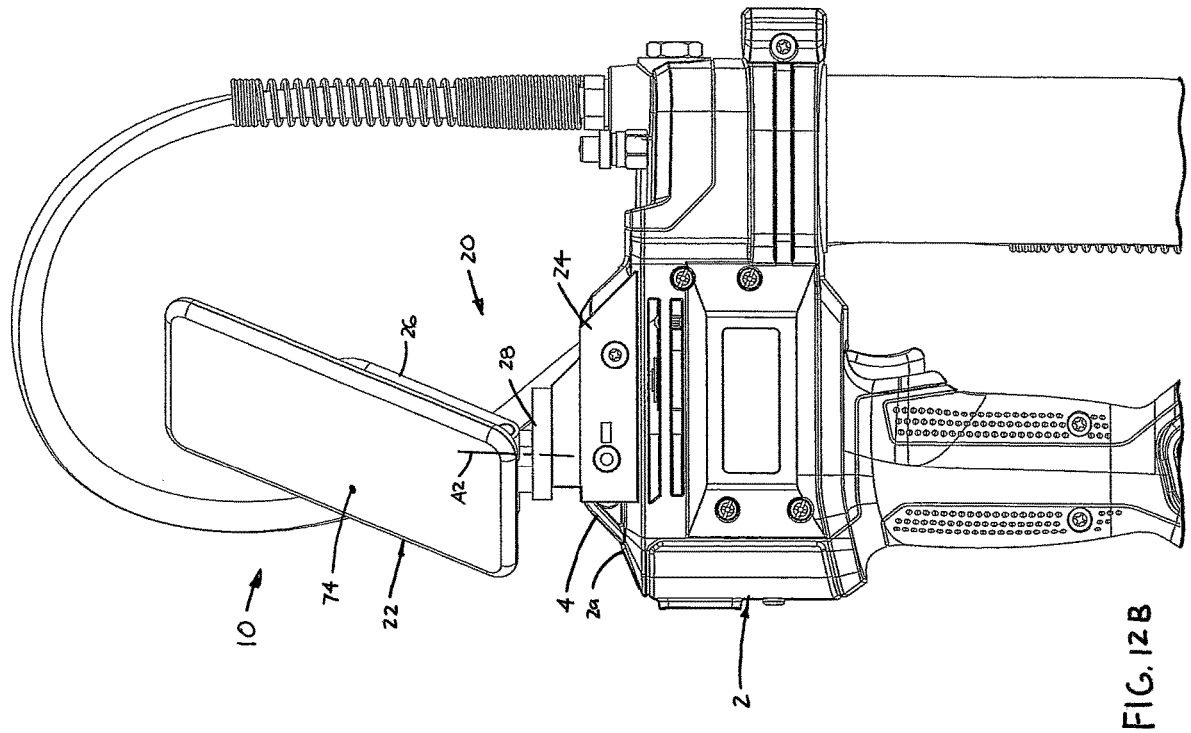
FIG. 12A and FIG. 12B, collectively
Figure 12A:
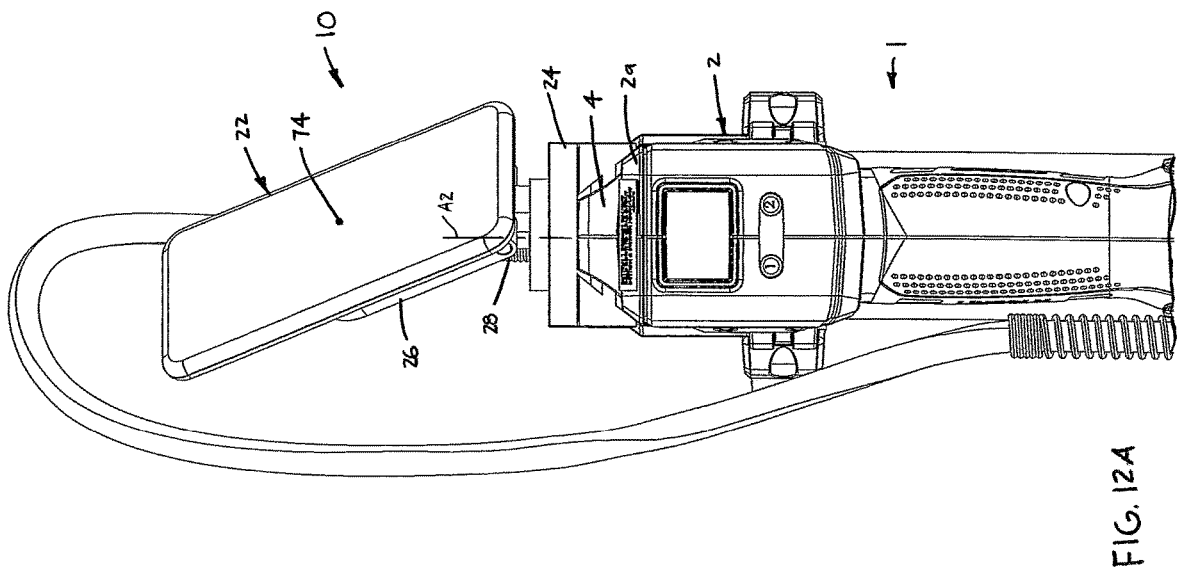

Specifically, the communication device 12 may be adjusted "forwardly" or "rearwardly" by pivoting the bracket second member 26 about the first axis A1, using the pin-lug portion of the joint 28, as shown in FIGS. 11A-11C. Additionally or alternatively, the communication device 12 may be adjusted from "side-to-side" from an initial "centered" position, shown in FIGS. 1, 10, 12 and 13, by pivoting the bracket second member 26 about the second axis A2, specifically by angularly displacing the joint turntable plate 58 with respect to the bracket first member base portion 30, as depicted in FIGS. 12A and 12B. Further, the orientation of the communication device 12 with respect to the grease gun housing 2 may be adjusted between a "portrait" orientation (FIGS. 13A and 13B) and a "landscape" orientation (FIGS. 14A and 14B), or any desired orientation in between, by angularly displacing the frame 22 about the third axis A3, specifically by turning the coupler plate 76 about the pivot shaft 80, and thus turning the frame 22 with respect to the bracket 20.

Thereafter, the operator is able receive information visually from the display 16 as the communication device 12 wirelessly communicates with the grease gun control 3. Specifically, the grease gun control 3 may transmit such information as maintenance actions to be taken at a particular lubrication point, such as an amount or dosage of lubricant required, a particular type of lubricant to be applied to the lubrication point or other corrective action required by a particular machine. Further, such transmitted information may include information about the grease gun 1 itself, such as a corrective action required or notification of a malfunction, or general information about using the grease gun 1, for example a maintenance route to be followed through a specific area of operation.

Although the bracket 20 and the frame 22 are formed as generally described above, it is within the scope of the present invention to construct either or both components 20, 22 in any other appropriate manner. For example, the bracket 22 may be formed as a solid or "non-adjustable" member that simply couples the communication device 12 with the grease gun 1, may have only a single degree of freedom provided by pivotably connecting the bracket second member 26 with the bracket first member 24, which may be provided by a discrete hinge (i.e., not integral with either bracket member), or may be pivotable with respect the grease gun 1 about the second axis by pivotably connecting the bracket first member 24 with the housing 2 (no alternatives shown). Further for example, the bracket second member 26 may be additionally or alternatively linearly displaceable with respect to the first bracket member 24 by constructing the bracket second member 26 as two pieces telescopingly slidable with respect to each other (not shown) or/and the bracket first member 24 may be formed in any other appropriate manner, such as of single-piece construction, adapted to connect with the grease gun housing 2 in any appropriate manner, either removably, semi-permanently or permanently. As yet other examples, the frame 22 may be fixedly (i.e., non-rotatably) attached to the bracket 20 or the holder 10 may be formed without the frame 22, in which case the communication device 12 is directly attached or coupled with the bracket 20 by any appropriate means (e.g., suction cup device, magnets, etc.). The holder 10 of the present invention includes all feasible constructions of the bracket 20 and/or frame 22 that fall within the scope of at least the broadest claims of the present disclosure.

Thus, it will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A communication assembly for a grease gun, the grease gun having a housing and a control disposed within the housing, the communication assembly comprising:
   a communication device configured to wirelessly communicate with the grease gun control and having a display for displaying information received from the control; and
   a bracket having a first end coupled with the grease gun housing and a second end coupleable with the communication device so as to secure the device to the grease gun;
   wherein the bracket includes a first member attached to the housing and providing the bracket first end, a second member attachable to the communication device and providing the bracket second end, and a joint configured to pivotably couple the first and second bracket members such that the bracket second member is angularly displaceable with respect to the bracket first member about a first axis.

2. The communication assembly as recited in claim 1 wherein the communication device is one of smartphone, a portable media player and a portable computing device.

3. The communication assembly as recited in claim 1 wherein the bracket second member is moveable with respect to the bracket first member so as to adjust a position of the communication device display with respect to the housing.

4. The communication assembly as recited in claim 1 further comprising a frame coupled with the bracket second member and configured to receive the communication device to removably couple the communication device with the grease gun.

5. The communication assembly as recited in claim 1 wherein the first bracket member is pivotably coupled with the grease gun housing such that the bracket is angularly displaceable about a second axis generally perpendicular to the first axis.

6. The communication assembly as recited in claim 5 further comprising a frame pivotably coupled with the bracket second member and configured to receive the communication device to removably couple the device with the grease gun, the frame being angularly displaceable about a third axis generally perpendicular to the first axis to adjust an orientation of the communication device display with respect to the grease gun housing.

7. The communication assembly as recited in claim 1 wherein at least a portion of the bracket is configured to deflect or fracture upon an impact force on the communication device of a predetermined magnitude insufficient to damage the communication device.

8. The communication assembly as recited in claim 1 further comprising a frame coupled with the bracket second end and configured to receive the communication device to removably couple the device with the grease gun.

9. The communication assembly as recited in claim 8 wherein the frame includes: a base member having a generally planar surface, opposing first and second edges and opposing third and fourth edges each extending between the first and second edges; and at least one pair of sidewalls each extending outwardly from the planar surface and along a separate one of the first and second edges or along a separate one of the third and fourth edges, the frame being sized such that the two sidewalls are disposeable against a separate one of two edges of the communication device when the device is disposed upon the base planar surface.

10. A communication assembly for a grease gun, the grease gun having a housing and a control disposed within the housing, the communication assembly comprising:
    a communication device configured to wirelessly communicate with the grease gun control and having a display for displaying information received from the control; and
    a bracket having a first end coupled with the grease gun housing and a second end coupleable with the communication device so as to secure the device to the grease gun; and
    a frame coupled with the bracket second end and configured to receive the communication device to removably couple the device with the grease gun and including:
        a base member having a generally planar surface, opposing first and second edges and opposing third and fourth edges each extending between the first and second edges; and
        at least one pair of sidewalls each extending outwardly from the planar surface and along a separate one of the first and second edges or along a separate one of the third and fourth edges, the frame being sized such that the two sidewalls are disposeable against a separate one of two edges of the communication device when the device is disposed upon the base planar surface.

* * * * *